United States Patent [19]
Criswell

[11] Patent Number: 5,879,116
[45] Date of Patent: Mar. 9, 1999

[54] SELF-LOCKING MACHINE SCREW FOR HIGH TEMPERATURE APPLICATIONS

[76] Inventor: Richard Criswell, 2111 Sea Lion Dr., No. 203, Las Vegas, Nev. 89128

[21] Appl. No.: 3,174

[22] Filed: Jan. 5, 1998

Related U.S. Application Data

[63] Continuation-in-part of Ser. No. 717,707, Sep. 23, 1996, Pat. No. 5,704,748.

[51] Int. Cl.[6] .............................. F16B 39/22; F16B 39/34
[52] U.S. Cl. ........................ 411/304; 411/299; 411/941.1
[58] Field of Search .................................... 411/299, 300, 411/303, 304, 322, 941.1

[56] References Cited

U.S. PATENT DOCUMENTS

| | | | |
|---|---|---|---|
| 902,646 | 11/1908 | Conn | 411/299 |
| 2,730,154 | 7/1956 | Aspey | 411/322 X |
| 2,852,056 | 9/1958 | Rapata | 411/304 |
| 3,149,654 | 9/1964 | Podell | 411/304 |
| 3,308,866 | 3/1967 | Russell et al. | 411/299 |

FOREIGN PATENT DOCUMENTS

| | | | |
|---|---|---|---|
| 975912 | 3/1951 | France | 411/304 |

*Primary Examiner*—Neill Wilson
*Attorney, Agent, or Firm*—Allen A. Dicke, Jr.

[57] ABSTRACT

This invention is directed to a self-locking machine screw which includes a recess in the body of the machine screw extending from the end of the machine screw and interrupting the outer surface as slots. The slots join the recess. A resilient locking member having threaded fingers is inserted into the recess with the fingers in the slots. The locking member extends outward from the machine screw thread surfaces so that the threaded fingers must be deflected when the machine screw is screwed into a threaded opening in machine structure to lock the machine screw in position.

22 Claims, 4 Drawing Sheets

SELF-LOCKING MACHINE SCREW FOR HIGH TEMPERATURE APPLICATIONS

CROSS-REFERENCE

This application is a continuation-in-part of my prior application, Ser. No. 08/717,707, filed Sep. 23, 1996, now U.S. Pat. No. 5,704,748, granted Jan. 6, 1998 the entire disclosure of which is incorporated herein by this reference.

FIELD OF THE INVENTION

This invention is directed to a machine screw configuration and its locking spring, which may be made of metal and which provides self-locking characteristics to the machine screw even in high-temperature environments.

BACKGROUND OF THE INVENTION

Machine screws are used in mechanical structures to hold parts together. In order to provide some resistance to vibration, the machine screws must be locked in place. A conventional way to lock machine screws in place is to employ lock washers under the heads. This has the disadvantage of cutting up the surface of the associated structure when the machine screw is removed for disassembly of the parts. Another common way in which machine screws are releasably locked in place without damage to the part is by using a nylon plug inserted into a hole or groove in the threaded body of the machine screw. When the machine screw is threaded into place, the nylon deforms to accommodate the threads. The compression of the deformed nylon maintains pressure on the threads to provide releasable locking of the machine screw in place.

Nylon is a thermoplastic synthetic polymer composition material so that, when it is heated, it becomes soft. Thus, in applications which include the presence of significant heat, nylon locked machine screws cannot be relied upon. There is need for a self-locking machine screw which can be employed in all environments, including high-temperature environments, as a simple replacement of machine screw without requiring machining of any of the parts with which the machine screw is mated.

SUMMARY OF THE INVENTION

This invention is directed to a self-locking machine screw which includes a recess in the body of the machine screw extending from the end of the machine screw and interrupting the outer surface as slots. The slots join the recess. A resilient locking member having threaded fingers is inserted into the recess with the fingers in the slots. The locking member extends outward from the machine screw thread surfaces so that the threaded fingers must be deflected when the machine screw is screwed into a threaded opening in machine structure to lock the machine screw in position.

It is, thus, a purpose and advantage of this invention to provide a self-locking machine screw which utilizes a metal resilient member with threaded fingers to engage in the tapped hole to resist loosening of the screw so that it can be employed in places where machine screw locking is required. The self-locking is generally useful, but it is particularly useful at higher temperatures which render nylon and other polymers ineffective.

It is another purpose and advantage of this invention to provide a self-locking machine screw which does not require machining of any of the parts into which it is screwed to obtain locking of the machine screw in position.

It is a further purpose and advantage of this invention to provide a self-locking machine screw which can be fabricated by swaging and cold-rolling of the machine screw to maximize machine screw materials properties.

It is a further purpose and advantage of this invention to provide a self-locking machine screw which serves as a simple replacement for presently used nylon-locked screws without additional modification of the parts so that replacement of nylon-locked screws may be readily accomplished in the field, as well as use in original manufacture.

Other purposes and advantages of this invention will become apparent from a study of the following portion of the specification, the claims and the attached drawings.

DESCRIPTION OF THE PREFERRED EMBODIMENTS

Figure 1:
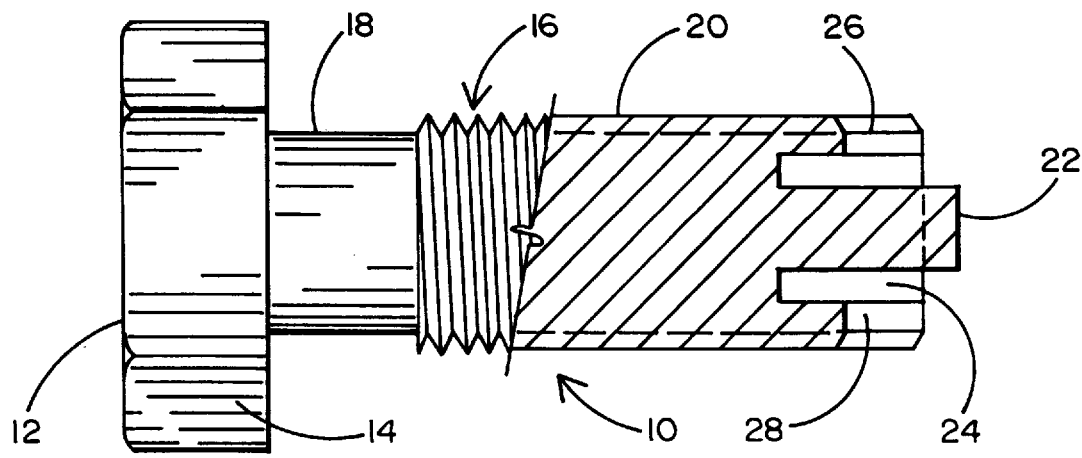
FIG. 1 is a side-elevational view of a machine screw which incorporates the first preferred embodiment of the resilient member to result in a self-locking machine screw, with parts broken away and parts taken in section.
Figure 2:
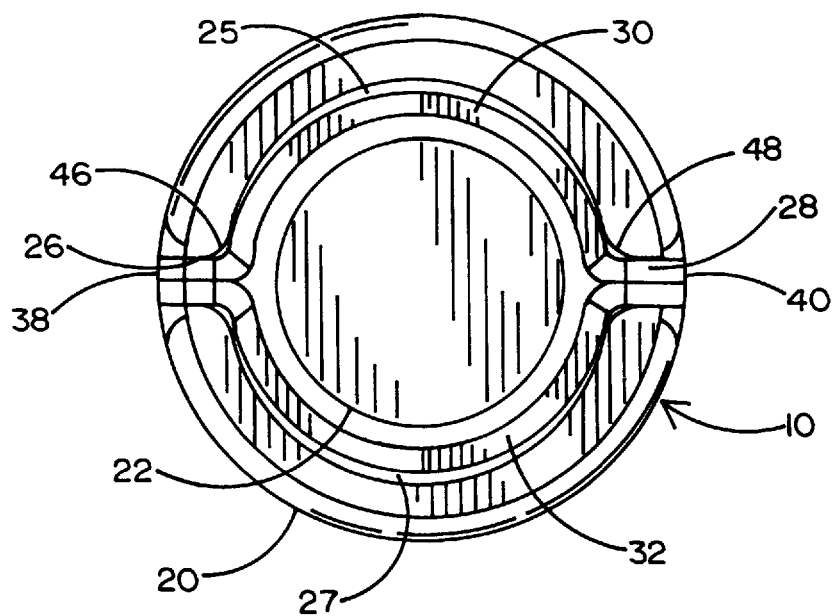
FIG. 2 is an enlarged end view of the machine screw of FIG. 1, showing the resilient locking member therein.

Machine screw 10 is shown in FIGS. 1 and 2. The machine screw 10 is illustrative of the first preferred embodiment of the self-locking machine screw of this invention. Machine screw 10 has a head 12, which is illustrated as being a hexagonal head for the purposes of installing the machine screw in a threaded part. The head 12 may be of any configuration, including a socket head, which can be engaged by a tightening tool such as a wrench. The head has an under side 14, which is for engagement against parts to be fastened together. The body 16 of the machine screw 10 is of an appropriate length to fasten together the parts to be attached. The body may include an unthreaded shank 18 and has a section beyond the shank which carries threads 20. The illustrated machine screw is intended to fasten two parts together. The upper part against which the head engages has a clearance hole in it, and the lower part has threads which are engaged by the threads 20 of the machine screw. Such is a conventional machine screw. Some machine screws are used as set screws and, as such, have a nose which extends beyond the threads. In order to illustrate that the self-locking structure is also useful in set screw applications, the machine screw 10 is illustrated as having a set screw nose 22, which extends beyond the threaded portion. Set screws often have an internal socket as a wrenching means.

Machine screw 10 has an annular recess 24 on the front end of the machine screw with the front end being defined as that which goes first into the threaded hole. The annular recess surrounds the nose 22 and is smaller than the root diameter of the threads 20. Radially opposite from each other, slots 26 and 28 are formed through the tubular portion of the front of the machine screw around annular recess 24 and all the way through the threads. In FIG. 1, the threads beyond the slots are seen. The nose is representative of a set screw. In the machine screw configuration, the nose extending beyond the threaded body is absent.

Figure 3:
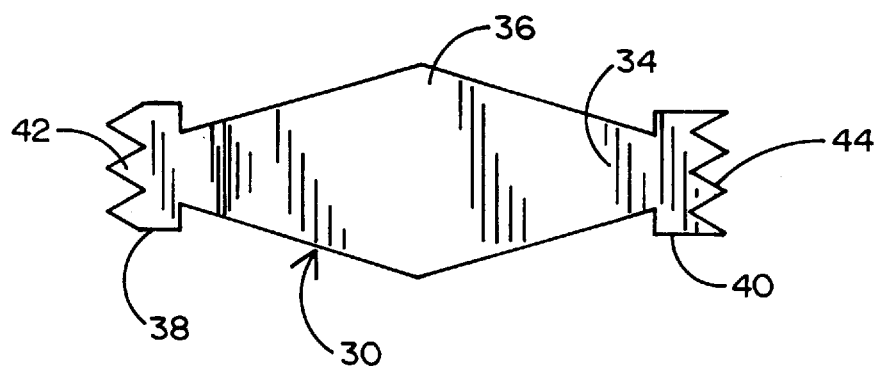
FIG. 3 a side view of the resilient locking member.

Two locking members 30 and 32 are inserted into the annular recess with their locking fingers extending out through the slots 26 and 28. Locking member 30 is shown in side elevation in FIG. 3. Locking member 32 is identical. Each of the locking members is formed of resilient material, preferably carbon or stainless steel which is hardened after it is shaped. The locking member 30 shown in FIG. 3 has a spring body 34 which is wider than its center 36 than where it joins it fingers 38 and 40. The fingers 38 and 40 are manufactured with thread cross sections 42 and 44, which are the same as the threads 20 on the machine screw. They are dimensioned so that the threads on the fingers are positioned in line with the threads adjacent the slots in which the fingers lie. The spring body is shaped to be able to lie into the annular recess. The length of the fingers 38 and 40, in the direction axial of the screw, is less than the depth of the slots 26 and 28 so that several screw threads on the screw body extend past the fingers. Several threads on the screw body are available to start the screw, before the fingers engage in the threaded hole.

The spring body is shaped so that its shoulders 46 and 48, which are at the ends of the spring body where the threaded fingers extend outwardly, bear against the inside wall of the annular recess 24 adjacent the slots 26 and 28. The locking members are configured so that in the free state they are somewhat larger than the distance across the shoulders 46 and 48 so that the spring must be deflected to be inserted. The engagement of the shouldes 46 and 48 against the inside wall of the annular recess 24 is the means for retaining the locking member in place and providing prestress on the locking members. During installation of the spring locking members, they are deflected with their fingers closer together than in the stop position. The annular groove may have outside-of-annular spaces 25 and 27 to receive the compressed spring locking members. When installed in the position shown in FIG. 2, the thread cross sections 42 and 44 extend radially outward from the threads 20 so that, when the machine screw is screwed into a threaded hole, the locking members are further strained so that they bend inwardly. The resulting stress maintains torsional friction between the machine screw and the body into which it is threaded to inhibit rotation of the machine screw.

Figure 4:
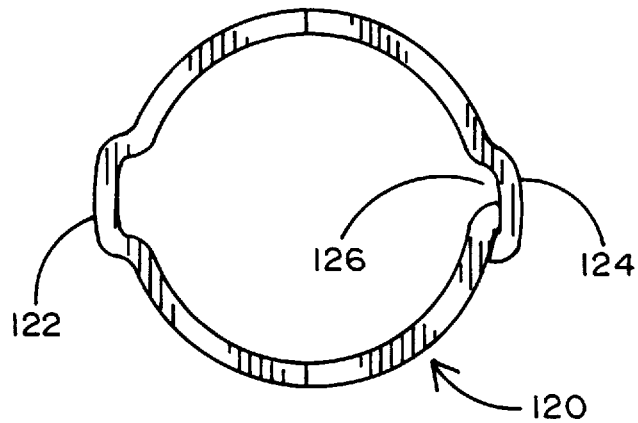
FIG. 4 is an end view of another preferred embodiment of the resilient locking member.

The locking member 120 shown in FIG. 4 fits into a similar annular recess 24. It has an edge view like that of FIG. 3. Locking member 120 is a one piece member made of the same kind of materials and is shaped to hook on itself to retain its shape both in its recess and when free. Locking member 120 has threaded fingers 122 and 124 which extend out of the slots like slots 26 and 28. Those slots would have to be a little wider in the circumferential direction. When in their slots, the fingers extend out a little farther than the threads on the body of the machine screw, with the outward limit being established by the stop shoulders on the ring of member 120 engaging on the inside of the recess adjacent the slots. Finger 124 has an interior hook into which end hook 126 engages. The one piece structure of locking member 120 is retained in shape by this engagement. The threads on the fingers thus act the same way as the threads on fingers 38 and 40.

Figure 5:
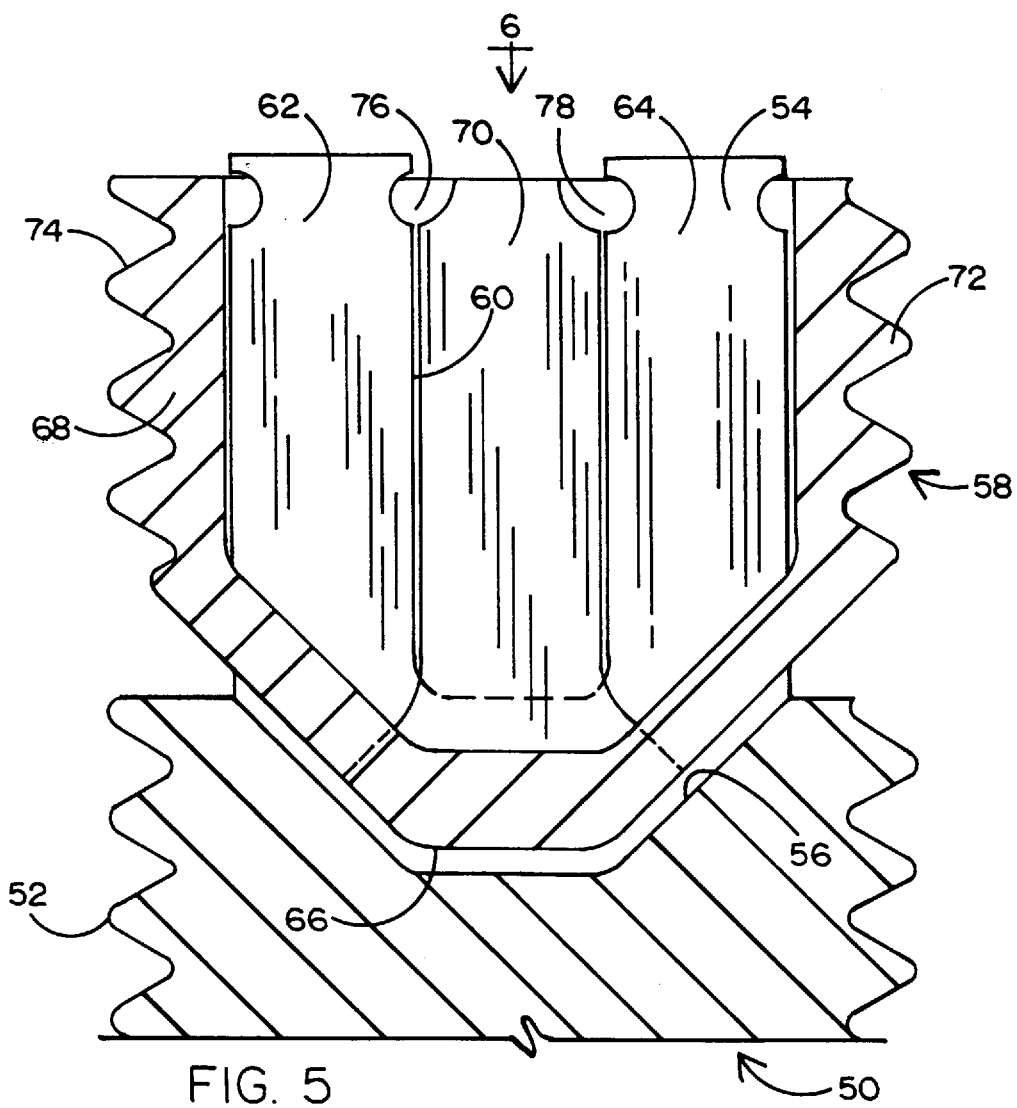
FIG. 5 is a central section through the tip of a machine screw showing a second preferred embodiment of the self-locking structure, with parts broken away.
Figure 6:
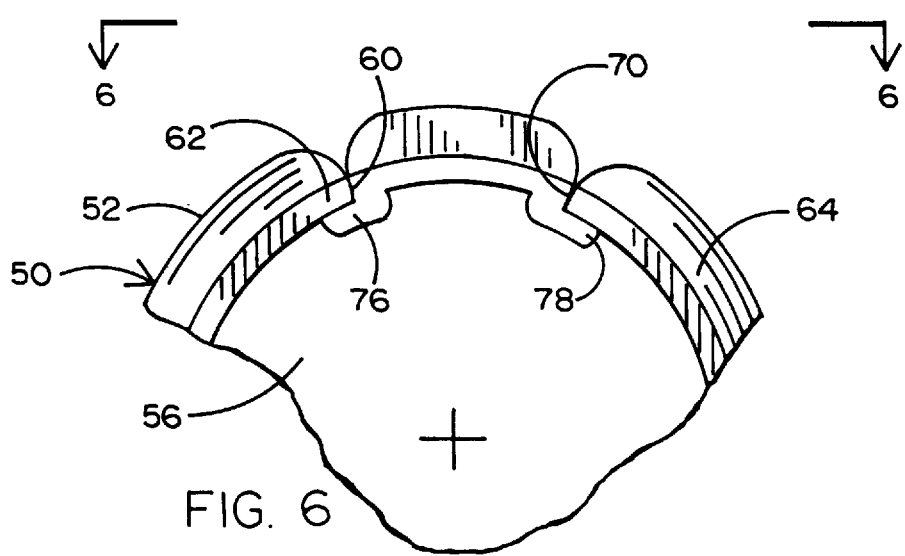
FIG. 6 is an end view, as seen generally along line 6 of FIG. 5, with parts broken away.
Figure 7:
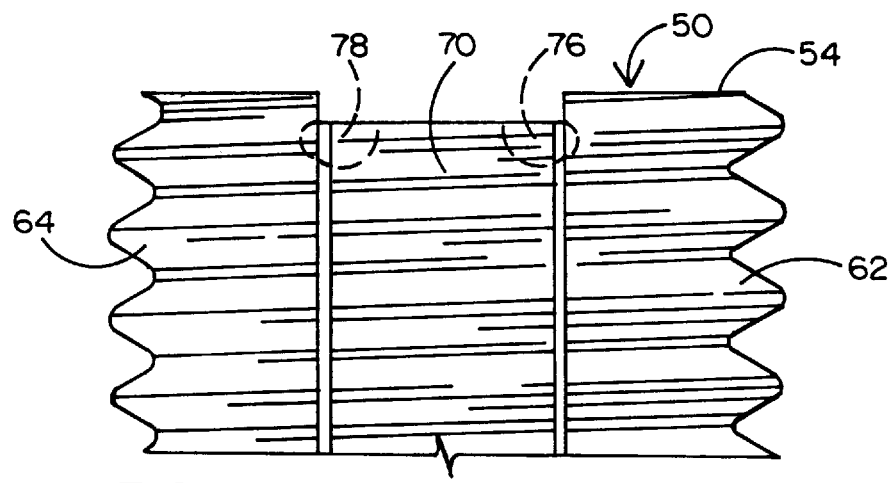
FIG. 7 is an elevational view, as seen generally along line 7—7 of FIG. 6, with parts broken away.

The machine screw 50 shown in FIGS. 5, 6 and 7 has the same criteria as the machine screw 10. It has a torque driving surface thereon such as a hex head or a wrench socket. It has threads 52, which extend forward to the front 54 of the machine screw. The front of the machine screw is formed with a recess 56 into which the locking member 58 is inserted. The recess 56 is concave. Four slots are formed behind the front of the machine screw to join with the recess. These slots are each at a right angle with respect to the adjacent slots.

FIG. 5 is a center-line section through the front end of the machine screw so that the near slot is not seen. Slot 60 is formed between arms 62 and 64. The arms 62 and 64 and the two similar arms on the near side of the section of FIG. 5 are the slotted annular structure which is left after the interior recess 56 and the four slots are formed. These arms are part of the original machine screw structure and are integral therewith. The threads thereon are a continuation of the threads 52 in the body of the machine screw 50. This structure may be seen best in FIG. 5. FIG. 6, similar to FIG. 5, shows only one of the slots and only two of the arms. This pattern continues repeatedly around the periphery of the machine screw at its front end so that there are four slots and four arms.

Locking member 54 has a central portion 66 from which four fingers extend upward. Fingers 68, 70 and 72 are shown in FIG. 5. The fourth finger is on the near side of the section diametrically opposite from finger 70. Finger 70 is also shown in FIGS. 6 and 7. As seen in FIG. 5, each of the fingers has screw threads thereon which are in the same spiral position as the screw threads 52 on the main body of the machine screw 50. The fingers extend between the arms, which are part of the machine screw. The locking member is formed of resilient material such as high carbon steel, which is hardened after forming. The forward threads on the fingers of the locking member, such as threads 74, are slightly smaller so as to permit starting engagement of the threads 74 and threads 52 into the threaded hole before the locking member engages. This permits easy starting of the machine screw.

The spread of the fingers of the locking member is limited by stops formed on the fingers which engage on the insides of the arm. The finger 70 carries stops 76 and 78 thereon, which are seen from the inside of FIG. 5, seen from the front end in FIG. 6 and seen from the outside in FIG. 7. These stops can be formed by squashing out ears to make a flange on the inside of the fingers which engages on the inside of the arms. These stops hold the fingers in to accomplish the dual purpose of holding the locking member and providing preload to the locking member. As the machine screw 50 is screwed into a threaded hole, it causes further deflection of the fingers, relieving the arms of their prestress and imposing the total spring force on the hole threads to provide torque, which inhibits rotation of the machine screw in its threaded hole.

Figure 8:
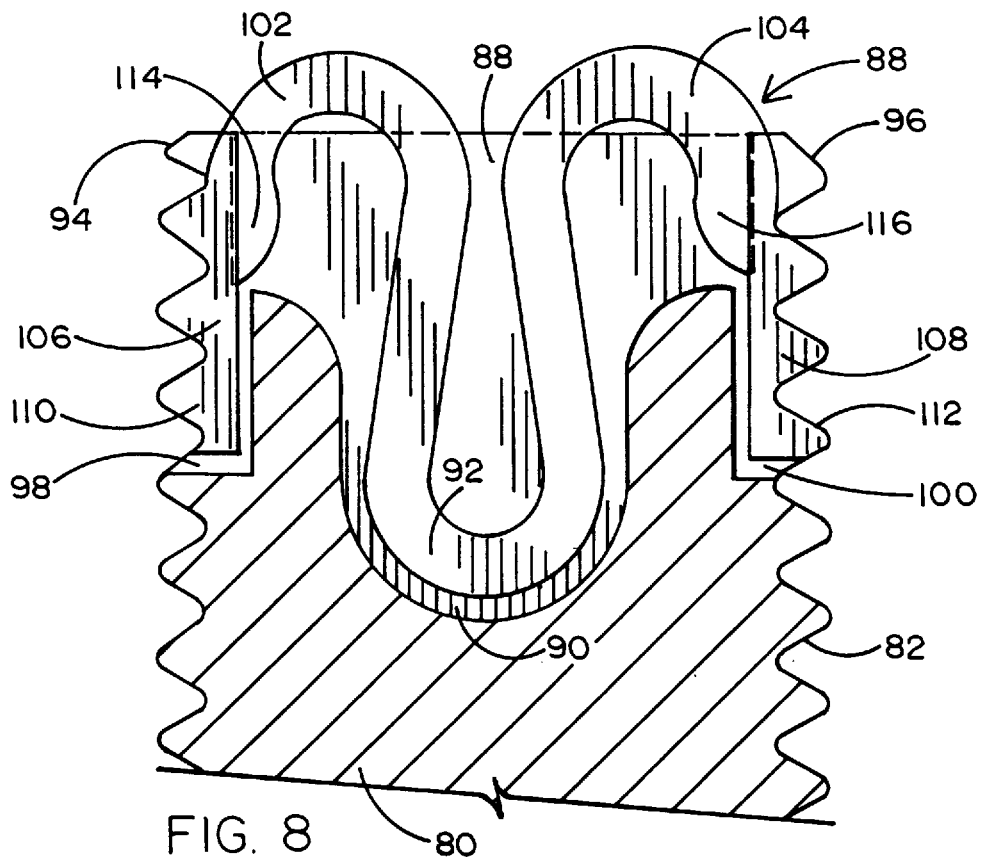
FIG. 8 is a sectional view through the center line of the tip of the machine screw showing a third preferred embodiment of the self-locking structure, in accordance with this invention.

FIG. 8 illustrates the machine screw 80 with its threads 82. The threads extend all the way to the front 84 of the machine screw. In the front of the machine screw is a recess 86, which is configured to receive locking member 88. The recess 86 is configured with a central depression defined by wall 90. The locking member 88 is formed of metal which is resilient in its finished condition. It may be hardened steel. In FIG. 8, the view is of the edge of the locking member, and the center 92 of the locking member is preferably wider in the direction perpendicular to the drawing sheet than the other portions of the locking member. The wall 90 may be in the form of a half cylinder with its axis perpendicular to the drawing sheet. At the front end of the machine screw, the recess includes slots all the way across to leave walls 94 and 96, which carry a continuation of the threads 82 up to the front 84 of the machine screw. As a continuation of those slots, rabbeted blind slots 98 and 100 are formed on each side. The side walls of these rabbeted blind slots are in line with the side walls of the cross slots which provide the faces upon which threads 94 and 96 are seen in FIG. 8.

The locking member 88 has a center at 92 with a substantially quarter turn bend upward on each side of the center. Reverse bends are indicated at 102 and 104 and represent the bending of the two spring arms back around about one-half turn. Fingers 106 and 108 are formed on the locking member on the free end thereof. The fingers are directed away from the front of the machine screw. These fingers respectively engage in the blind slots 98 and 100. These fingers have threads thereon, represented by threads 110 and 112. These threads are in spiral alignment with the threads 82 on the body of the machine screw. The forward threads 94 and 96 are on the body of the machine screw and are positioned forwardly of the threads on the fingers so as to permit starting engagement of the machine screw in its threaded hole before the locking member engages. The locking member is made of spring material and is configured so that its threaded fingers thrust radially outward to resiliently engage in the threaded hole. The locking member thus resists rotation of the machine screw in its threaded hole.

The locking member has at least one stop formed thereon on each end adjacent the threaded finger. Stops 114 and 116 are shown in FIG. 8, and the other side of the locking member away from the view in FIG. 8, preferably has similar stops. The stops make that portion of the locking member wider than the blind slots 98 and 100, which extend all the way to the front of the machine screw. Thus, the stops engage on the interior of the machine screw walls to limit outward movement of the fingers. These stops thus act as stops in the outward direction of the spring fingers. These stops have two functions. One is to permit the locking member to be prestressed so that, in its free state, it is significantly farther across the spring fingers than in the assembled condition shown. The second function is that, with the engagement of these stops with force against the interior walls of the machine screws, the locking member is retained in place in the machine screw during handling and installation.

This invention has been described in its presently preferred best mode, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A self-locking machine screw comprising:
   a male substantially cylindrical body having a radius and having first and second ends defining the length of said body, said body having screw threads on the exterior thereof, said screw threads extending at least a portion of the length of said body from said first end toward said second end;
   means on said body for engaging said body to rotate said body;
   a recess in said first end of said body, slots extending from said recess outward from said body so that said recess forms inwardly facing shoulders adjacent said slots, said slots interrupting said screw threads; and
   a resilient metallic locking member in said recess, said resilient metallic locking member having first and second fingers, each of said first and second fingers having a plurality of threaded engagement surfaces thereon sized and shaped to engage on threaded surfaces in a threaded hole, said fingers locking in said slot so that said threaded engagement surfaces are positioned in substantially spiral alignment with the threads on the body and resiliently extend from said slots so that when said machine screw is turned into a threaded hole, a portion of said threaded engagement surfaces on said resilient locking member are resiliently deflected to provide a controlled frictional drag of prevailing torque that resists turning of said screw; and
   each of said fingers having a stop thereon to engage said shoulder adjacent said slot to limit radial outward motion of said fingers to retain said resilient metallic locking member in position within said recess.

2. The self-locking machine screw of claim 1 wherein said machine screw is metallic.

3. The self-locking machine screw of claim 1 wherein there is a set screw nose in the center of said recess and said resilient metallic member in said recess extends around said nose.

4. The self-locking machine screw of claim 3 wherein said recess is substantially annular around said nose and there is at least one resilient metallic locking member therein, said locking member lying in said recess.

5. The self-locking machine screw of claim 2 wherein said recess is substantially annular around said nose and there are first and second resilient metallic locking members, each of said first and second resilient locking members lying in said recess and extending substantially halfway around opposite sides of said nose.

6. The self-locking machine screw of claim 5 wherein each of said first and second resilient locking members has first and second fingers thereon and each of said first and second resilient locking members engages against the shoulder adjacent said slots to limit radial outward motion of said fingers.

7. The self-locking machine screw of claim 6 wherein each of said first and second resilient locking members is of substantially uniform thickness in a radial direction of said machine screw and each of said first and second resilient locking members is wider at the center than adjacent said fingers.

8. The self-locking machine screw of claim 7 wherein said threads on said body extend farther toward said first end than said threaded engagement surfaces of said fingers.

9. The self-locking machine screw of claim 1 wherein there is one resilient metallic locking member, said resilient locking member lying in said recess, said first and second threaded fingers being on said locking member.

10. The self-locking machine screw of claim 1 wherein said threads on said body extend farther toward said first end than said threaded engagement surfaces of said fingers.

11. The self-locking machine screw of claim 1 wherein there are blind slots in the exterior of said machine screw in line with said slots, said blind slots extending away from said first end of said machine screw, said fingers lying in said blind slots.

12. The self-locking machine screw of claim 1 wherein said resilient locking member has a center substantially half turn central bend therein and first and second substantially half turn reverse bends respectively between said central bend and said fingers.

13. The self-locking machine screw of claim 12 wherein central bend lies within said recess.

14. The self-locking machine screw of claim 12 wherein said reverse bends lie toward said first end of said machine screw.

15. The self-locking machine screw of claim 12 wherein said bosses are positioned on said resilient locking member between said reverse bends and said fingers.

16. The self-locking machine screw of claim 1 wherein said resilient locking member has a central portion and has at least two arms thereon, said arms being substantially equally spaced around said central portion, said machine screw having a number of slots therein equal to the number of arms on said resilient member, each of said arms having a finger thereon and each of said fingers having said threaded engagement surfaces thereon.

17. The self-locking machine screw of claim 16 wherein there are at least arms attached to said central member and there is a finger having threaded engagement surfaces on each of said arms.

18. The self-locking machine screw of claim 17 wherein each of said fingers has a boss thereon, said bosses lying within said recess and said bosses engaging against the walls of said recess adjacent said slots so as to limit outward motion of said fingers.

19. The self-locking machine screw of claim 16 wherein said base of said resilient metallic locking member is toward said second end of said machine screw and said fingers extend toward said first end, said threaded surfaces on said fingers adjacent said first end being smaller than said threaded surfaces on said finger toward said second end so as to ease starting engagement of said self-locking machine screw into a threaded hole.

20. A self-locking machine screw comprising:
   a male substantially cylindrical body having an access and having a first end and a second end defining the length of said body, said body having screw threads having a root diameter, said screw threads extending at least a portion of the length of said body from said first end toward said second end;
   means on said body for engaging said body for rotating said body;
   a recess in said first end of said body, said recess having walls extending generally lengthwise with respect to the length of said body, said body having walls defining first and second opposite slots extending generally radially from said annular recess to the exterior of said body, said walls defining inwardly facing shoulders adjacent the junction of said recess walls and said slot walls;
   at least one resilient metallic locking member in said recess, said resilient metallic locking member having first and second fingers thereon, with each of said first and second fingers having thread engagement surfaces thereon, said fingers being sized to extend out of said slots and said thread engagement surfaces thereon being in line with adjacent screw threads on said body, said resilient metallic locking member being curved between said fingers to lie in said annular recess, said resilient metallic locking member having means thereon engaging against said shoulder to limit the outward position of said fingers out of said slots.

21. A self-locking machine screw comprising:
   a male substantially cylindrical body having a first end and a second end defining the length of said body, said body having screw threads, said screw threads extending at least a portion of the length of said body from said first end toward said second end;
   means on said body for engaging said body to rotate said body into and out of the threaded hole;
   a recess in said first end of said body;
   walls defining slots across said body, said slots intersecting said recess to define inwardly directed shoulders in said recess adjacent said slots;
   a resilient metallic locking member in said recess, said resilient metallic locking member having first and second fingers thereon, said first and second fingers having a plurality of threaded engagement surfaces thereon sized and shaped to engage on the threaded surfaces in a threaded hole, stop means on said resilient metallic locking member adjacent said fingers, said stop means facing outward and engaging said shoulders to limit the outward position of said fingers so that said resilient metallic locking member can be stressed and inserted into said recess and into said slots so that stress on said stop means against said shoulders retain said resilient metallic locking member in said recess.

22. The self-locking machine screw of claim 21 wherein said resilient member is wider at its center than adjacent said stop means.

* * * * *